United States Patent [19]
Wiegand et al.

[11] Patent Number: 6,099,217
[45] Date of Patent: Aug. 8, 2000

[54] DEVICE FOR SPATIALLY MOVING A BODY WITH THREE TO SIX DEGREES OF FREEDOM IN A CONTROLLED MANNER

[76] Inventors: Alexander Konrad Wiegand, An der Bilz 3, D-63906 Erlenbach am Main, Germany; Sascha Weikert, Neubruchstrasse 5, CH-8127 Forch, Switzerland

[21] Appl. No.: 09/091,369

[22] PCT Filed: Dec. 19, 1996

[86] PCT No.: PCT/IB96/01454

§ 371 Date: Feb. 22, 1999

§ 102(e) Date: Feb. 22, 1999

[87] PCT Pub. No.: WO97/22436

PCT Pub. Date: Jun. 26, 1997

[30] Foreign Application Priority Data

Dec. 20, 1995 [CH] Switzerland .............................. 3600/95

[51] Int. Cl.[7] ........................................................ B23C 1/12
[52] U.S. Cl. ........................ 409/201; 74/490.03; 408/234; 408/237; 409/211; 409/216; 901/23; 901/41
[58] Field of Search .................................... 409/201, 202, 409/211, 212, 216, 235; 408/234, 236, 237; 74/490.01, 490.03, 490.06; 901/23, 41, 30

[56] References Cited

U.S. PATENT DOCUMENTS

| | | | |
|---|---|---|---|
| 4,645,084 | 2/1987 | Deike ...................................... | 212/271 |
| 4,988,244 | 1/1991 | Sheldon .................................. | 409/132 |
| 5,378,282 | 1/1995 | Pollard .................................. | 118/697 |
| 5,388,935 | 2/1995 | Sheldon .................................. | 409/201 |
| 5,401,128 | 3/1995 | Lindem et al. .......................... | 409/201 |
| 5,715,729 | 2/1998 | Toyama et al. .......................... | 409/201 |
| 5,865,576 | 2/1999 | Arai et al. ................................ | 409/201 |
| 5,941,128 | 8/1999 | Toyama et al. .......................... | 409/211 |

FOREIGN PATENT DOCUMENTS

| | | |
|---|---|---|
| 0 263 627 A1 | 4/1988 | European Pat. Off. . |
| 0 494 565 A1 | 7/1992 | European Pat. Off. . |
| 0 534 585 A2 | 3/1993 | European Pat. Off. . |
| WO 92/17313 | 10/1992 | WIPO . |

OTHER PUBLICATIONS

Hervé, J.M. et al., "Methodical Design Of New Parallel Robots Via The Lie Group Of Displacements," in Theory and Practice of Robots and Manipulators, Morecki et al. (Eds.), Springer pp. 301–306.

*Primary Examiner*—Daniel W. Howell
*Attorney, Agent, or Firm*—Marshall, O'Toole, Gerstein, Murray & Borun

[57] ABSTRACT

The device serves for moving a movable platform (2) in respect to a base (1). The connection between platform and base is established by six legs (4a–4f), which are connected to the platform in articulated manner. At the base side, they rest in articulated manner on sliding carriages (6a–6f). The sliding carriages can be displaced along parallel guiding tracks (7a–7c), by means of which position and orientation of the platform can be adjusted. Two sliding carriages are running independently of each other on each guiding track, allowing a movement with a total of six degrees of freedom. Since two sliding carriages share one guiding track, the design is simplified and some drive components can be dispensed with.

19 Claims, 7 Drawing Sheets

DEVICE FOR SPATIALLY MOVING A BODY WITH THREE TO SIX DEGREES OF FREEDOM IN A CONTROLLED MANNER

The invention relates to a movement device for a machine tool or a robot according to the preamble of the independent claims.

In such a device the part of the machine that is to be moved can be moved in up to three translational and rotatory degrees of freedom in respect to a base by moving several sliding carriages, each of which is connected by means of suited joints via a rigid articulated rod with the part to be moved, on at least two parallel linear tracks.

Machine tools for machining primarily have the object to provide certain relative movements between a tool and a workpiece. The most commonly used milling tools have three axes. Here, the tool can be moved, not only in its rotative cutting movement, but also in three translatory degrees of freedom in respect to the work piece. In addition to this, tools with four or five axes are used as well where the tool can additionally be moved in one or two rotatory degrees of freedom in respect to the workpiece.

Most of the conventional machine tools have a serial kinematic structure. The required number of degrees of freedom is achieved by serial arrangement of the corresponding number of linear and rotative axes. It is, however, increasingly desired that, on the one hand, the stiffness of the device is as high as possible, while, on the other hand, the masses to be moved should be as small as possible such that additionally generated mass forces remain small. Tools with serial kinematic structure are not well suited for such requirements because the bottom most axis of movement has to carry the weight of all those lying above it. In addition to this, the errors of movement of all axes are added, be they thermal, geometric or caused by the present loads.

Because of their kinematic structure machine tools with parallel kinematic structure, such as they have existed for a few years and are described in WO 92/17313, EP-A-0534 585 and U.S. Pat. No. 4,988,244 are better suited for high requirements in dynamics and accuracy. These machines are based on the so called generalized Stewart platform. The part of the machine to be moved is moved by means of six telescope like, driven legs. The masses to be moved are smaller than in serial structures and the errors of the individual axes of movement are not added. Only forces in axial direction of the legs, where they have their largest stiffness, are generated. Bending strain, as it is found in serial arrangements, does not occur.

The disadvantage of these tools lies in the fact that the available working space is small compared to the overall size of the machine. Enlarging the working space is connected with a corresponding enlargement of the whole machine and correspondingly with a lost in dynamics because the legs become larger, heavier and less stiff. A further disadvantage lies in the fact that these machines can hardly be built using conventional standard components. Yet a further disadvantage is the fact that these machines always have six axes, and therefore require six drives, guidings and measurement systems even though milling tools only require up to five axes, and even three axes are sufficient in most cases.

J. M. Herve and F. Sparacino describe in "Theory and Practice of Robots and Manipulators", A. Morecki, G. Bianchi, K. Jaworek (ed.), Springer pp. 301ff, different robot manipulators, among others also a model with three parallel lead screws, wherein a nut is moved along each lead screw. Two legs connected to a parallelogram are attached to each nut in articulated manner. This device is, however, not suited for machining tools because it does not provide sufficient stability and accuracy.

It is an object of the invention to provide a device of the type mentioned initially that substantially avoids as well as possible the above mentioned disadvantages of the machines based on the Stewart platform and, in particular, that guarantees a high stability and accuracy and/or a large working space.

These objects are achieved by the device according to the independent claims.

By using parallel tracks, a linear enlargement of the working space is achieved. Since, at the same time, at least four sliding carriages that can be displaced independently of each other are provided, it is possible to not only linearly displace but also to tilt the movable part in spite of the one-dimensional preferred direction. This makes it possible to assume more different positions and/or to correct for inaccuracies. If each leg is provided with its own sliding carriage, even a movement along three translatory and about three rotative degrees of freedom can be achieved even if all sliding carriages can only be displaced in parallel manner.

At least one of several of the tracks can carry more than one sliding carriage such that less components are required. In this case at least part of the drive of the corresponding two sliding carriages is combined such that the design is simplified further. Linear electromagnetic motors are especially suited for such a design.

For receiving especially high forces the tracks should preferably rest against the base along their whole length such that they do not bend.

For tailoring the device to the desired work-space, preferably one or several of the legs can be adjustable in length, e.g. manually.

In another aspect of the invention the sleds are guided such that they cannot tilt about an axis parallel to the direction of displacement, e.g. by providing each track with two separate beams, on which beams the sliding carriage is resting. This makes it possible to use especially simple, stable and commercially available tracks and carriages.

If two legs are arranged on a sliding carriage, means can be provided on the carriage for controlled change of the relative position of the legs in respect to each other or of the relative position of one of the legs in respect to the sliding carriage. By means of this, the number of degrees of freedom is increased and, in particular, operating this means allows to readjust the position of the mobile part and provides additional degrees of freedom, e.g. in other to compensate for inaccuracies of the track geometry.

The invention is especially suited for arrangement in a machine tool and is suited to meet the corresponding high requirements in regard to precision and load.

Further advantages and applications of the device according to the invention result from the now following description of an embodiment by reference to the figures, wherein.

Figure 4:
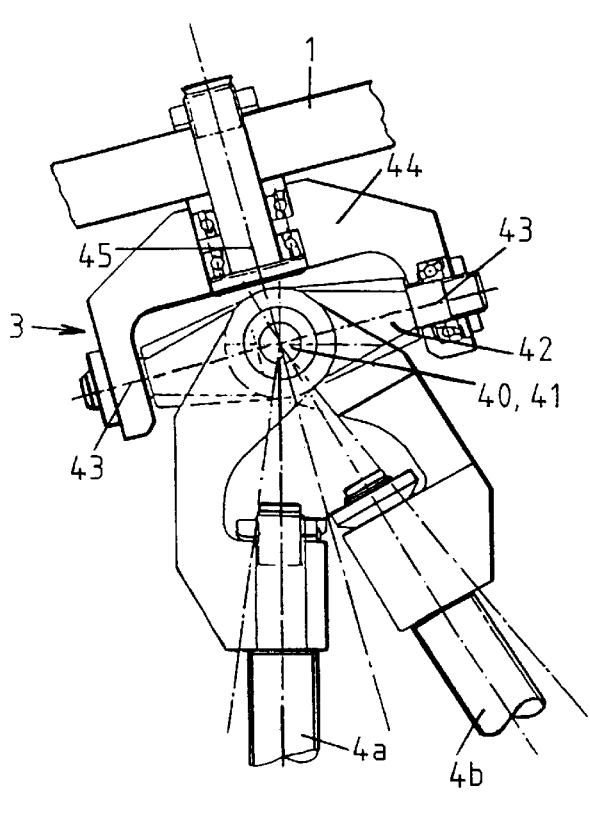
Figure 5:
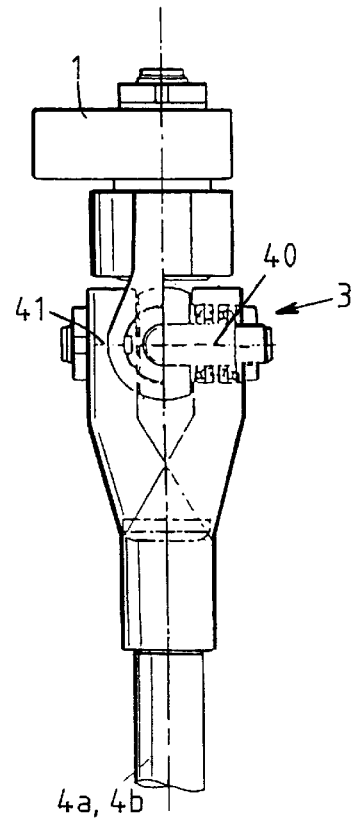
Figure 6:
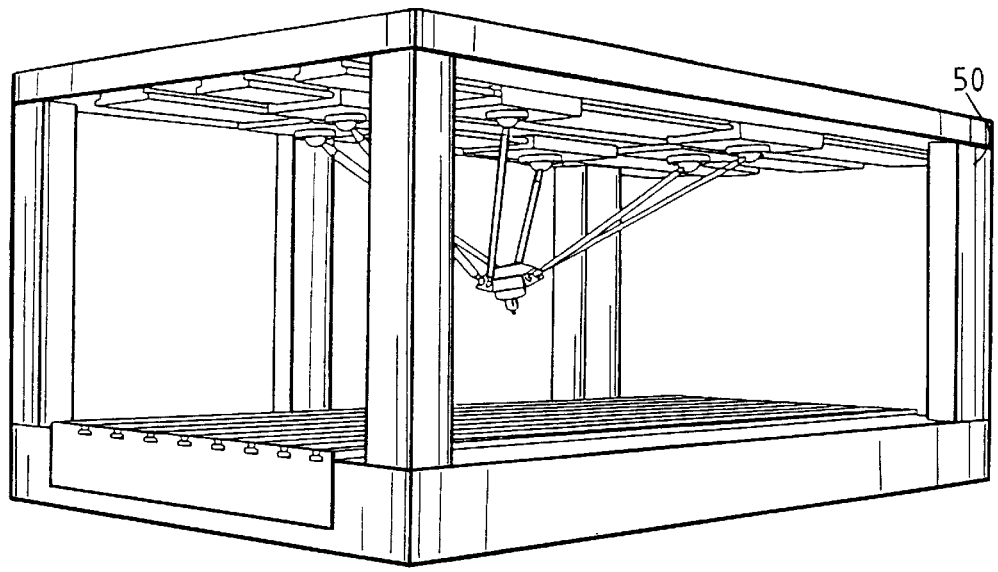
Figure 7:
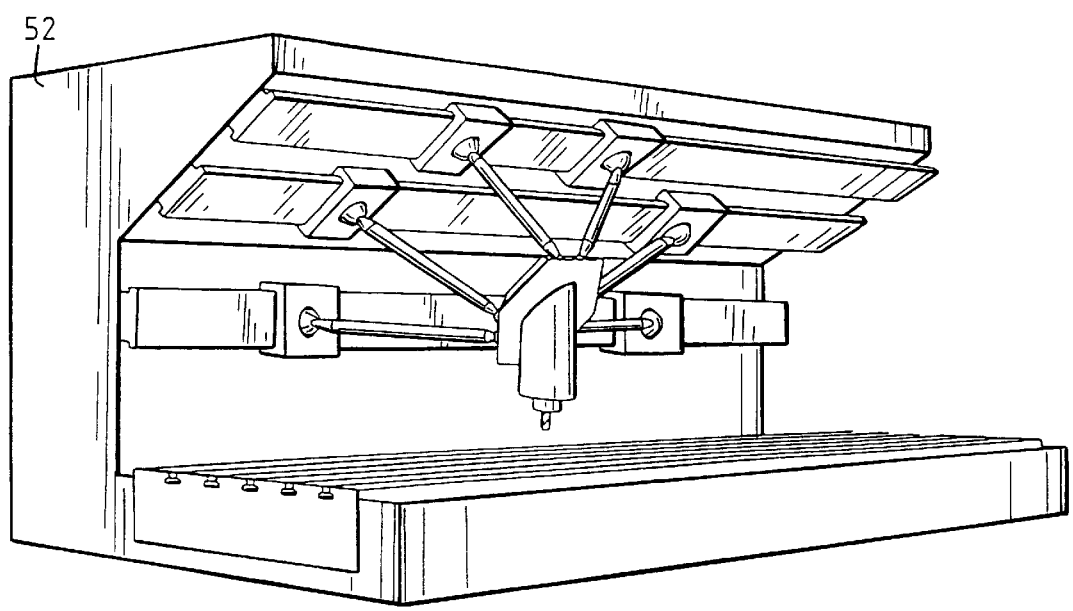
Figure 8:
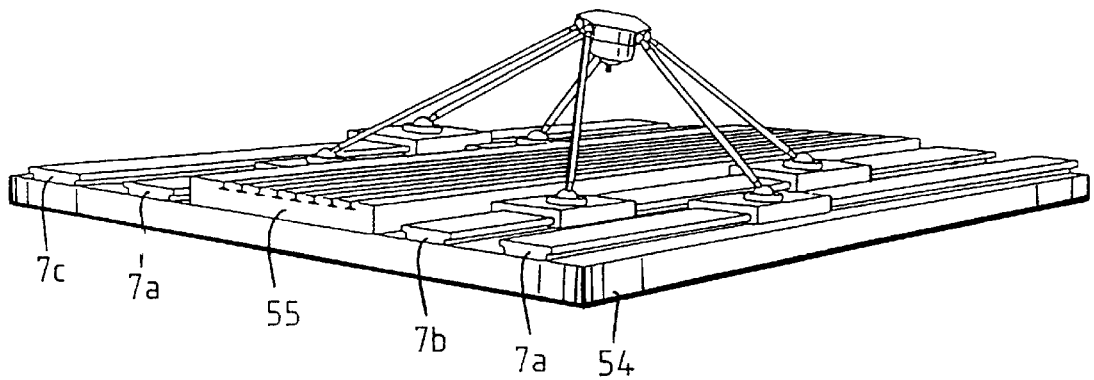
Figure 9:
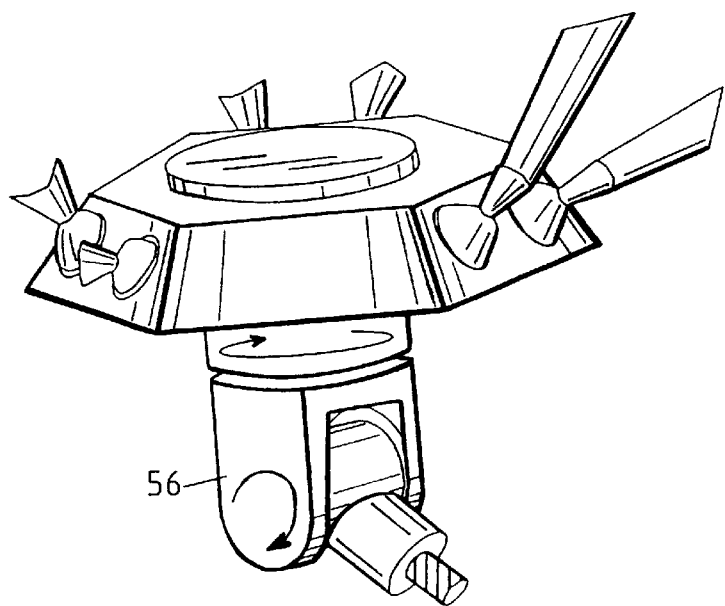
Figure 10:
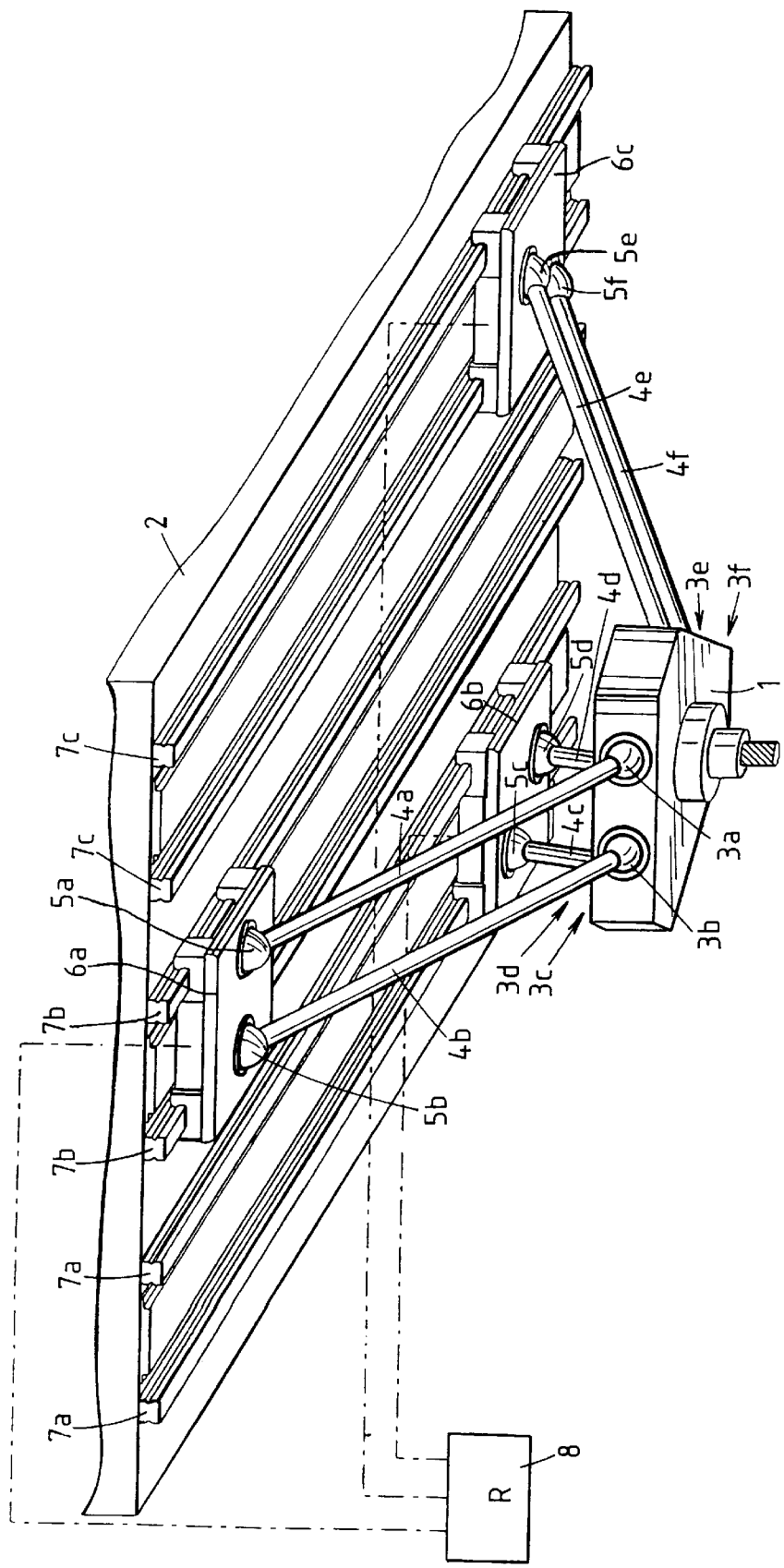
Figure 11:
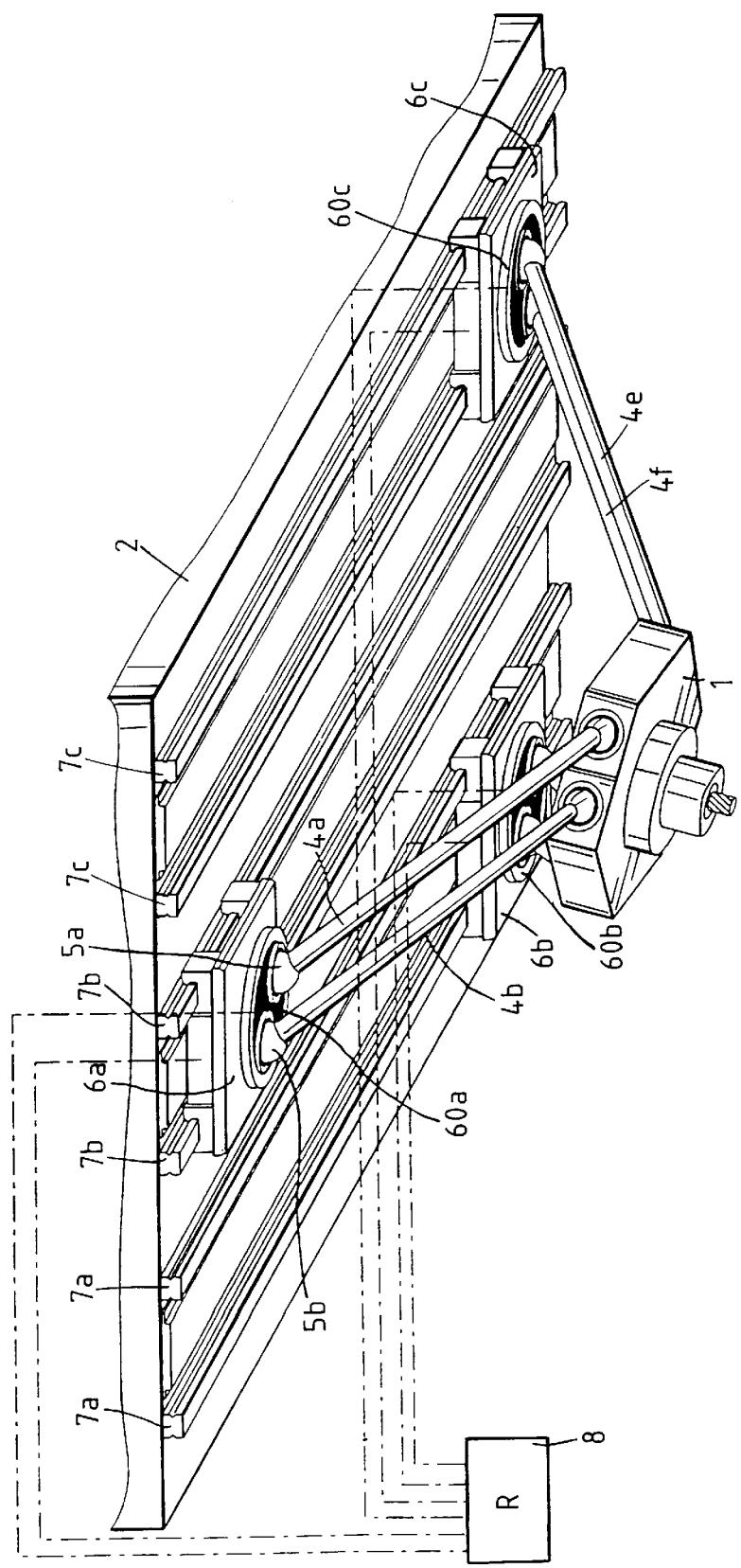

FIG. 4 is a detailed view an embodiment of a platform side joint where two rods are connected in one joint with the platform, FIG. 5 is a side view of the embodiment of the joint of FIG. 4, FIG. 6 is a schematic representation of an embodiment of the device as a milling tool, FIG. 7 is a schematic representation of an embodiment of the device as a milling tool the workspace of which can be accessed from three sides, FIG. 8 is a schematic representation of an embodiment of the device as a milling tool with a very simple bench, FIG. 9 is a platform of the device with two additional axes of rotation, FIG. 10 is a further embodiment of the invention, and FIG. 11 is a variant of the invention that is improved as compared to the embodiment of FIG. 10.

Figure 1:
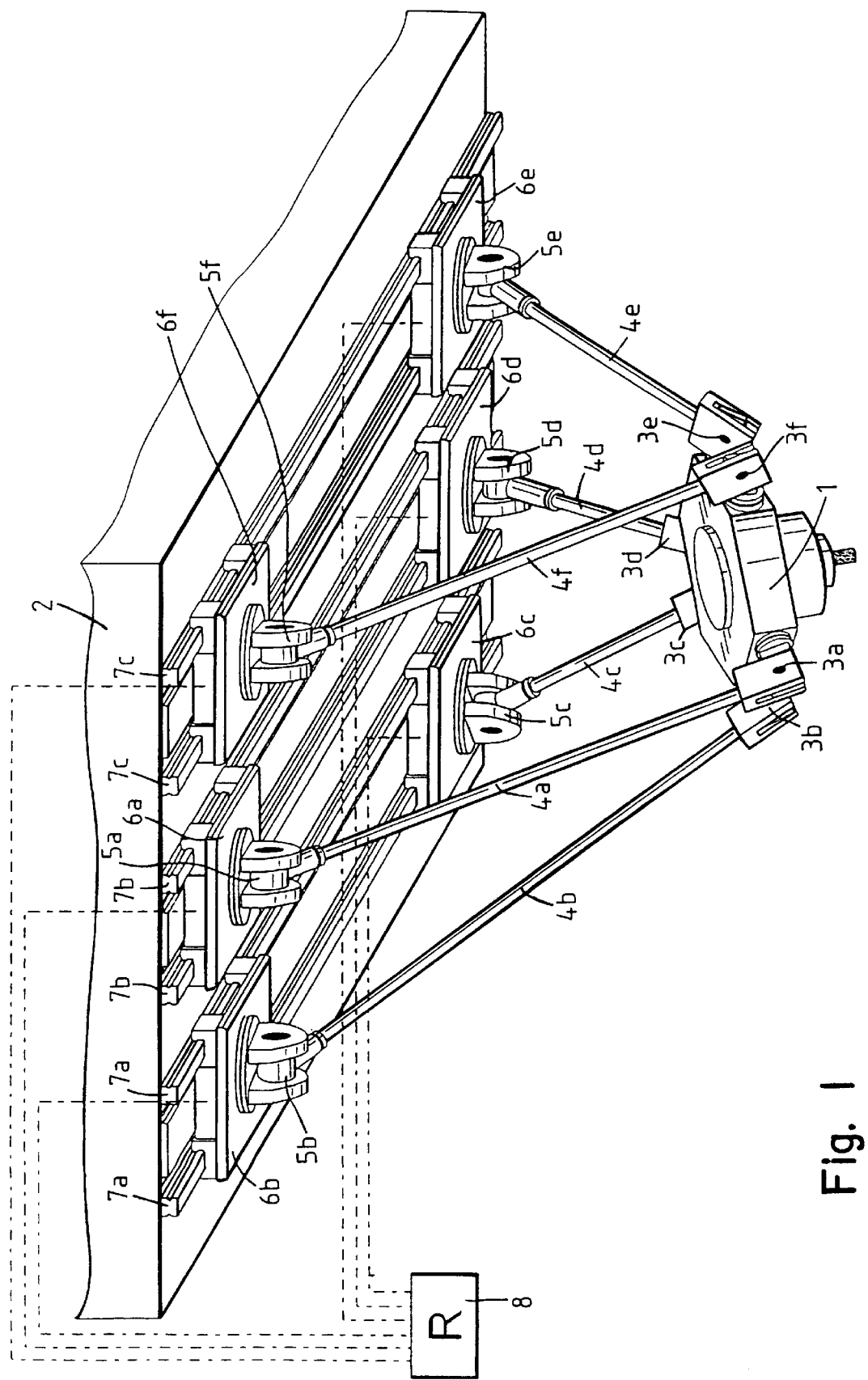
FIG. 1 is a perspective total view of a preferred embodiment of the invention.

The basic design of a preferred embodiment of the invention is shown in FIG. 1. A working platform 1 forms the mobile part of the device. It serves as a support for a working tool, such as a milling spindle, or for a workpiece, and is to be moved relatively to a base 2 in six degrees of freedom. The working platform 1 is connected via joints 3a–3f to the ends of six rigid rods 4a–4f. The other ends of the six rigid rods are connected via joints 5a–5f to six sliding carriages 6a–6f. Each of three parallel linear tracks 7a–7c fixedly connected to the immobile base 2 guide two sliding carriages. Each sliding carriage possesses a motor and a position measurement system. The positions of the sliding carriages relative to the base can synchronously be controlled by means of a control 8. In this way, platform 1 can be moved in space in six degrees of freedom in controlled manner.

The linear tracks 7a–7c act as rails and have the task to limit all motional degrees of freedom of the sliding carriages 6a–6f with the exception of a displacement along the direction of the linear track and to receive the forces transferred through the rods. The linear tracks 7a–7c, or the two track beams forming a linear track, rest along the whole length directly or indirectly against the planar surface of base 2 and are connected thereto. They can therefore receive large forces without bending.

The sliding carriages 6a–6f are guided in the linear tracks, wherein a tilting of the carriages about an axis parallel to the direction of displacement is prevented. Such a support can be implemented by means of commercially available, low price linear tracks and carriages.

An alternative basic design of the device is shown in FIG. 10. This design is discussed at the end of the description.

Figure 2:
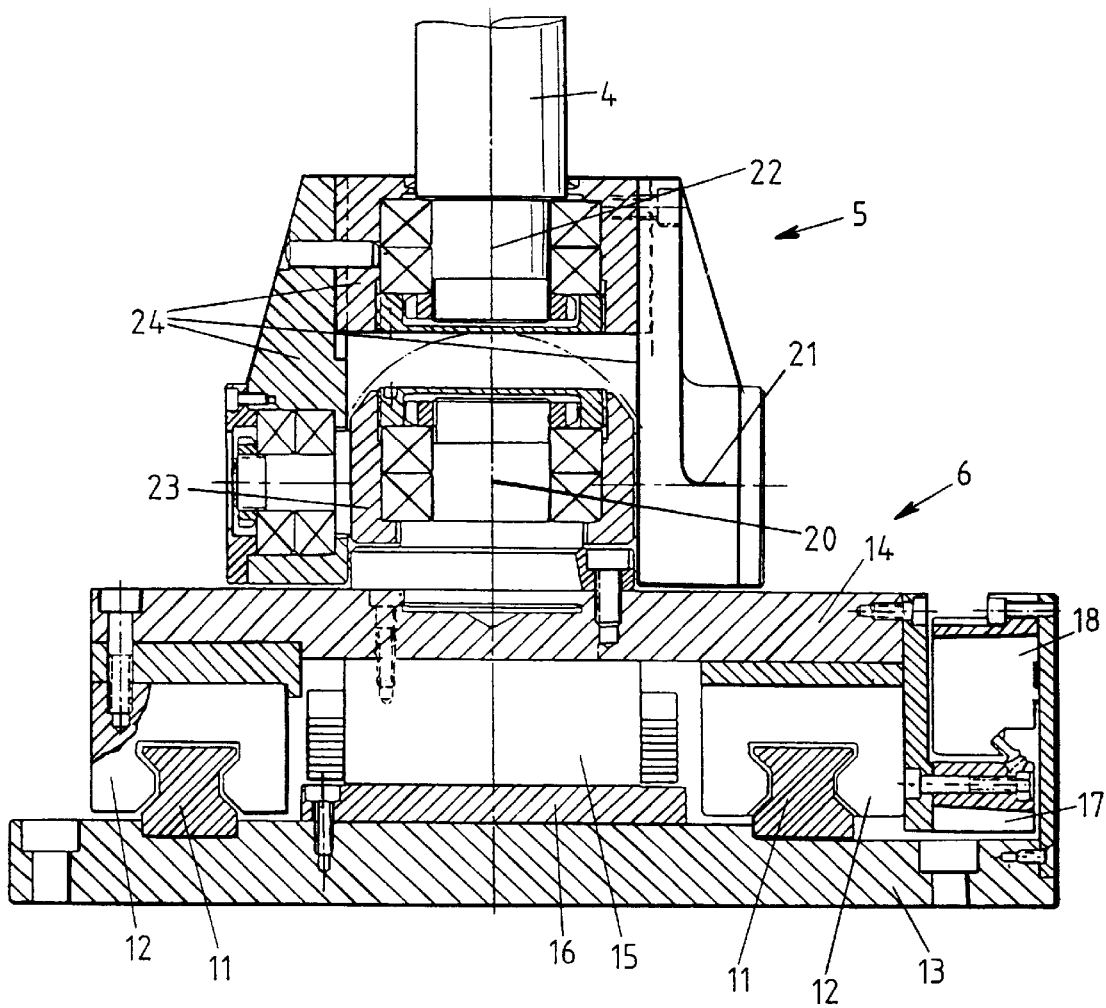
FIG. 2 is a detailed view of a sliding carriage with the corresponding joint.

FIG. 2 is a possible embodiment of a sliding carriage with track, joint and a rod. The linear tracks are implemented as roller guides consisting of two track beams 11, on which for each carriage 6 four runners 12 are running on rollers. In FIG. 2 only two of the runners 12 can be seen. The tracks are fixedly mounted to an immobile base plate 13 connected to base 2. Mounted to the four runners 12 is a plate 14. On one side of plate 14 a joint 5 is mounted, connecting plate 14 with rod 4. On the other side of plate 14 there is a coil assembly of a primary part 15 of a linear motor. The secondary part 16 of the linear motor is fixedly connected to the base 16 and generates the magnetic field for all carriages on a track. The linear motors are the drives of the carriages. Alternatively, other driving principles of hydraulic, pneumatic or electrical nature can be used as well. In order to make it possible that several sliding carriages using common components of a drive can move along one track, a threaded gearing with a ball is a preferred alternative to the linear motor, which comprises a fixed threaded spindle and a driven nut, wherein the nut including the motor moves with the sliding carriage, or a rack and pinion drive, where the rack is attached to the base and the pinions and the drive are arranged on the carriages and move with them.

A scanner head 17 is mounted on each sliding carriage and scans a linear ruler 18 for position measurement. The carriages arranged on the same track can scan the same linear ruler. The position measurement of the carriages can also be carried out by other measuring methods, such as by laser interferometry or, when using threaded or rack and pinion gearings, by angle measurements.

Joint 6 is arranged on the top side of each sliding carriage and connects the same to an end of rod 4. The other end of rod 4 is also connected by means of a joint 3 to platform 1. The two joint prevent any translatory relative movements of the bodies they are connecting and only allow rotational movements. For each rod 4, three rotative degrees of freedom must be provided at one end and at least two rotative degrees of freedom at the other in order for the platform to have six motional degrees of freedom. For design reasons or for admitting even larger movements in the joints, it may be reasonable to increase the number of rotational degrees of freedom beyond the given number. FIG. 2 shows, by way of an example, an embodiment of the carriage-side joint 5. It consists of a combination of three rotative joints with rotational axes 20, 21 and 22 and the intermediate members 23, 24. The axis of rotation 20 of the first rotative joint connecting the table 14 with first intermediate member 23 is perpendicular to the table surface of the corresponding carriage 6. The axis of rotation 21 of the second rotative joint, which connects first intermediate member 23 to second intermediate member 24, is perpendicular to axis 20 of the first rotative joint. The axis of rotation 22 of the third rotative joint, which connects second intermediate part 24 to rod 4, is perpendicular to the one of the second rotative joint and coincides with the rod axis. In order to provide a connection free of play, the rotative joints each are biased, two rowed, tilted ball bearings.

Figure 3:
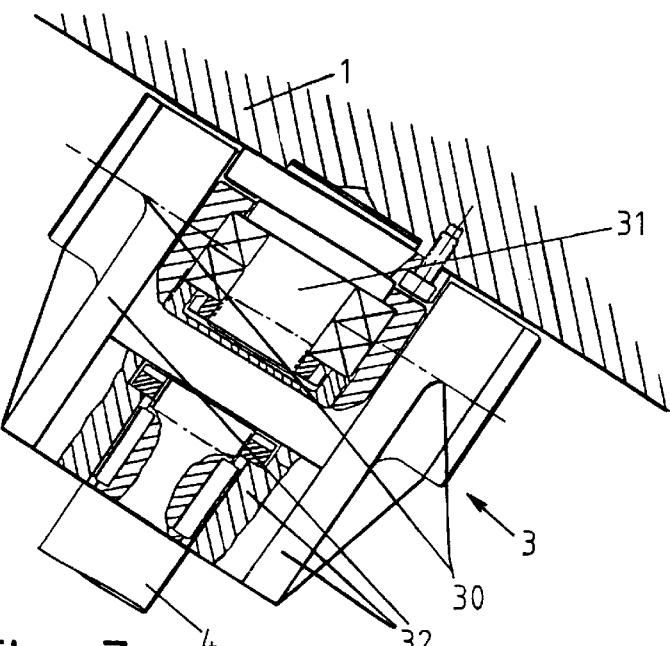
FIG. 3 is a detailed view of a platform side joint.

FIG. 3 shows an example of an embodiment of the platform-side joint. It consists of a combination of two rotative joints with axes of rotation 30, 31 and an intermediate member 32. Axis 30 of the first rotative joint, which connects rod 4 to intermediate member 32, is perpendicular to the rod axis. Axis 31 of the second rotative joint, which connects intermediate member 32 with platform 1, is perpendicular to the one of the first rotative joint.

Alternatively to the embodiments of joints shown sow far, which are assembled from a combination of rotative joints, spherical joints can be used at both ends or only one end of the rods.

FIGS. 4 and 5 show an example of a second embodiment of a platform-side joint 3, where two rods 4a, 4b are connected to platform 1 via the same joint 3. In this case, only a total of three joins 3 are arranged on the platform. Both rods 4a, 4b are connected with a first intermediate member 42 by means of two rotative joints having the same axis of rotation 40 and 41, respectively. First intermediate member 42 is connected via a rotative joint with axis 43 to a second intermediate member 44, which in its turn is mounted to platform 1 via a rotative joint with axis 45. The axes of every two consecutive rotative joints are perpendicular to each other. This has the advantage that each pair of rods forms a triangle, which, when the carriages are fixed, only has one rotational degree of freedom about the axis that comprises the two carriage side points of articulation, and therefore provides a more stable arrangement than a rectangle of joints having more degrees of freedom.

Depending on application, a tool, a workpiece to be machined or a gripper device can be arranged on platform 1.

Platform 1 is moved in space relative to base 2 by control 8 calculating the corresponding positions of the carriages depending on the path to be traveled by the platform and feeding them as desired values to the feedback loops of each carriage.

In the following, an application of the invention as a milling machine is described in more detail. In this case, platform 1 either carries a milling spindle or the workpiece to be machined.

FIGS. 6–9 show sketches of different embodiments of the invention as a milling machine. FIG. 6 shows an embodiment where the device is arranged within a box-shaped structure 50 and the spindle is oriented vertically. The application corresponds to the one of conventional milling machines in portal or gantry design and is intended for large workpieces in mold production or aerospace industry.

In FIG. 7 a milling machine is shown where the bench 52 is c-shaped and the advantage of which consists of the fact that the workspace is accessible from three sides.

In FIG. 8 a special embodiment is shown where machining takes place within the space spanned by the rods. This arrangement has the advantage that the bench 54 has a very simple shape and therefore, on the one hand, is very cost-efficient in production and, on the other hand, has a very high stiffness. In the center of bench 54 there are means 55 for receiving a workpiece, which form the workspace. For symmetry reasons and in order to move the same number of carriages on both sides or the workspace, four instead of three linear tracks 7a–7d were used in this case. Two sliding carriages are moved on each inner track 7a, 7b, only one on each outer track 7c, 7d. It is also possible to provide a total of only two tracks on both sides of the workspace on which all of the carriages are moving.

Depending on the arrangement of the tracks, the positions of the joints, the lengths of the rods and the position of the platform in space, the platform can, besides translatory relative movement, also carry out rotational movements of varying magnitude. These are, however, always limited by collisions of the rods with each other or with the platform, and by the fact that the mechanism may end up in a singular position. If larger rotative movements are required by an application, additional rotative axes can be arranged on the platform. In FIG. 9, there is, for example, an additional forkhead 56 with two rotational axes mounted to the platform.

Depending on the workspace desired for a given application and depending on the rigidity that the device is to show within the workspace, the number, position and length of the linear tracks, the position of the joints on the platform and the length of the individual rods are defined during construction of the machine to be built. In order to adapt the workspace of an existing machine to a given machining process, the rods can be designed such that their length can be adjusted in indexed manner, e.g. manually.

A further embodiment of the invention is shown as an example in FIG. 10. In this arrangement the platform 1 can only be moved into the three Cartesian spatial directions in respect to base 2. The legs are guided in pairs on the sliding carriages 6a–6c. The sliding carriages 6a–6c are movable along the three linear tracks 7a–7c. On each of the three carriages 6a–6c the ends of two rods 4a–4f are mounted by means of joints 5a–5f. The other rod ends are connected to platform 1 via joints 3a–3f. The joints of the rod pairs 4a, 4b, 4c, 4d, 4e, 4f form, in each position of the platform, the corner points of a parallelogram. The articulation points of the platform side joints 3a–3f lie in pairs on the sides of a triangle. In FIG. 10 the two joints of each rod are shown as ball pivots, but combinations of rotational joints are possible as well. For this purpose, we especially refer to the embodiments of FIGS. 3–6. In the arrangement of FIG. 10, however, only two rotational degrees of freedom are required in the two joints at each rod end.

In the embodiment of FIG. 10 error in parallelism of the linear tracks, geometric deviations of the position of the articulation points and errors in the length of the rods lead to angular errors in the movement of the platform that cannot be compensated by control 8. For this reason, it can make sense to provide means on the carriages that allow the control 8 to change the position of the joints on a carriage in respect to each other or in respect to the carriage. This can e.g. be implemented by moving a joint of a carriage in controlled manner along a linear axis arranged on the carriage. Another possibility consists of using a rotational axis arranged on the carriage, by means of which the excentrically mounted joint is moved in controlled manner along a circular path. It is also possible to move, in controlled manner, both joints of a carriage about a rotational axis arranged on the carriage and to change in this way their relative position in respect to the carriage. Such an arrangement is shown in FIG. 11. In this embodiment the joints 5 are arranged in pairs on rotating tables 6a, 6b, 6c. Each rotating table can be rotated in respect to the corresponding carriage about an axis perpendicular to the carriage, wherein the rotational movements are controlled by control 8. This not only allows to correct the angular errors of the platform or tracks, respectively, but one obtains again a mechanism where platform 1 can be moved in respect to base 2 in six degrees of freedom.

It can also be advantageous to use combinations of the embodiments of FIGS. 1 and 10, where each of a part of the carriages linearly moves the foot ends of two rods and the remaining carriages only the foot end of one rod. For example, the joints of the two rods 4a, 4b of FIG. 10 can be mounted on two individual carriages instead of the carriage 6a, which carriages are moved on the tracks 7a and 7c. This saves one linear track and allows to use the space between is the two remaining tracks in the same manner as in the embodiment of FIG. 8. The platform can be moved in three degrees of freedom. If the carriages moving two rods are provided with means for changing, in controlled manner, the position of the joints in respect to each other or to the corresponding carriage, the platform can be moved in six degrees of freedom.

What is claimed is:

1. A moving device for a machine tool or a robot comprising a base, a mobile part, which is mobile in respect to said base, a plurality of substantially parallel tracks that are immobile in respect to said base, at least four carriages longitudinally displaceable independently of each other along said tracks, wherein at least two of said carriages are arranged on the same track, a plurality of drives, each of said drives being attributed to one of said carriages, and at least six legs connecting said base and said mobile part wherein said legs are connected in articulated manner to said mobile part and rest on their base side, in articulated manner on said carriages, wherein each of said carriages is carrying at least one of said legs, wherein said carriages are operatable for displacing and tilting said mobile part.

2. The device of claim 1 wherein it comprises six carriages displaceable independently of each other, each of which is carrying exactly one leg.

3. The device of claim 1 wherein a first part of each of said drives is mounted to the corresponding track or said base and a second part of each of said drives is arranged on the corresponding carriage, and that the first part of said drives is shared by all drives of carriages running on the same track.

4. The device of claim 3 wherein said drives are electromagnetic linear motors and wherein said second part comprises an electrically operated coil assembly.

5. The device of claim 1 wherein each of said cariages comprises a sensor for detecting the position of the carriage on the corresponding track, wherein a first part of each of said sensors is arranged on the corresponding track or said base and a second part of each of said sensors is arranged on the corresponding carriage, and wherein said first part is shared by all sensors of carriages running on the same track.

6. The device of claim 1 wherein each of said legs is mobile in respect to its carriage about three rotational axes and in respect to said mobile part, about at least two rotational axes.

7. The device of claim 1 wherein each of said legs is mobile in respect to its carriage about at least two, and in resect to said mobile part, about three rotational axes.

8. The device of claim 1 wherein a part of said legs is grouped in pairs and the legs of each pair are connected to said mobile part by means of at least one common rotational axis.

9. The device of claim 1 wherein said tracks are resting substantially along their whole length against said base.

10. The device of claim 1 wherein said base comprises a substantially planar surface upon which the tracks are arranged in a plane.

11. The device of claim 10 wherein said base comprises holding means for receiving a workpiece or a tool and wherein said tracks are arranged on both sides of said holding means.

12. The device of claim 1 wherein said base forms a substantially C-shaped profile wherein said tracks extend along an inner side of said profile.

13. The device of claim 1 wherein at least a part of said legs are adjustable in length.

14. The device of claim 1 wherein said carriages are longitudinally displaceable in a direction of displacement and wherein all said carriages are mounted on said tracks in non-tiltably manner about said direction of displacement.

15. The device of claim 14 wherein each of said tracks comprises at least two beams, each beam resting substantially along its whole length on said base, and wherein each of said carriages is in contact with both beams of its track.

16. The device of claim 1 wherein at least one of said carriages carries two of said legs.

17. The device of claim 16 wherein said at least one of said carriages carrying two legs comprises adjustment means for controlled adjustment of a relative position of said two legs in respect to each other or in respect to said carriage.

18. The device of claim 17 wherein said adjustment means comprises a rotating table rotatable in respect to said carriage and wherein said two legs are mounted on said rotating table.

19. The device of claim 1 further comprising a control means for controlling positions of said carriages.

* * * * *